(No Model.) 2 Sheets—Sheet 1.
A. J. COWMAN.
POTATO DIGGER.
No. 367,192. Patented July 26, 1887.
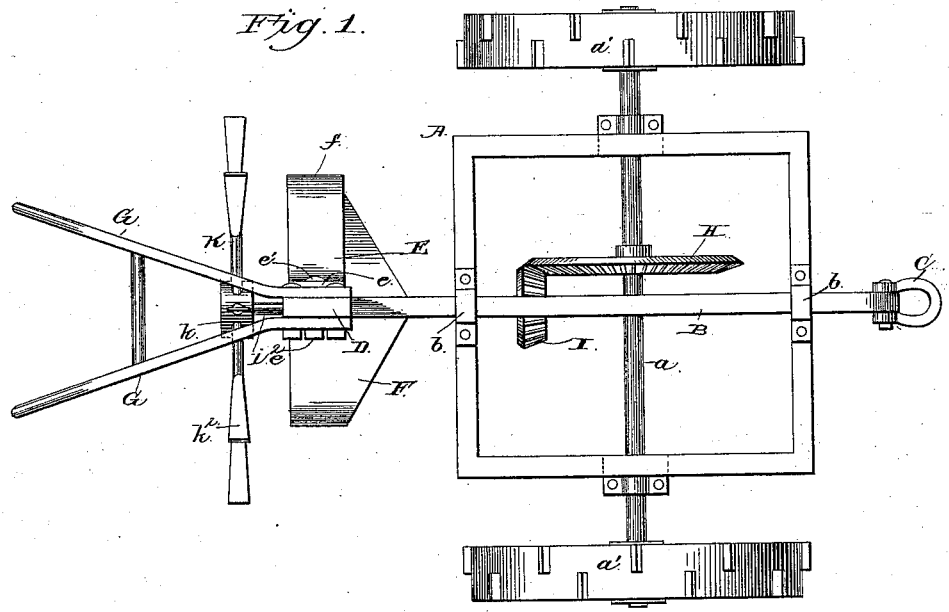
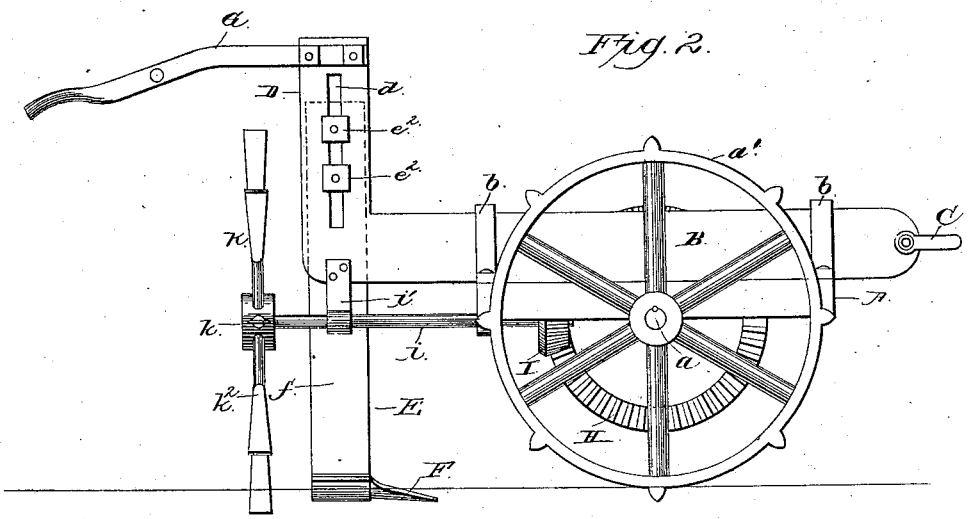
Witnesses
M. C. Fowler
E. G. Siggers
Inventor
Andrew J Cowman
By his Attorneys,
C. A. Snow & Co.

(No Model.) 2 Sheets—Sheet 2.
A. J. COWMAN.
POTATO DIGGER.
No. 367,192. Patented July 26, 1887.
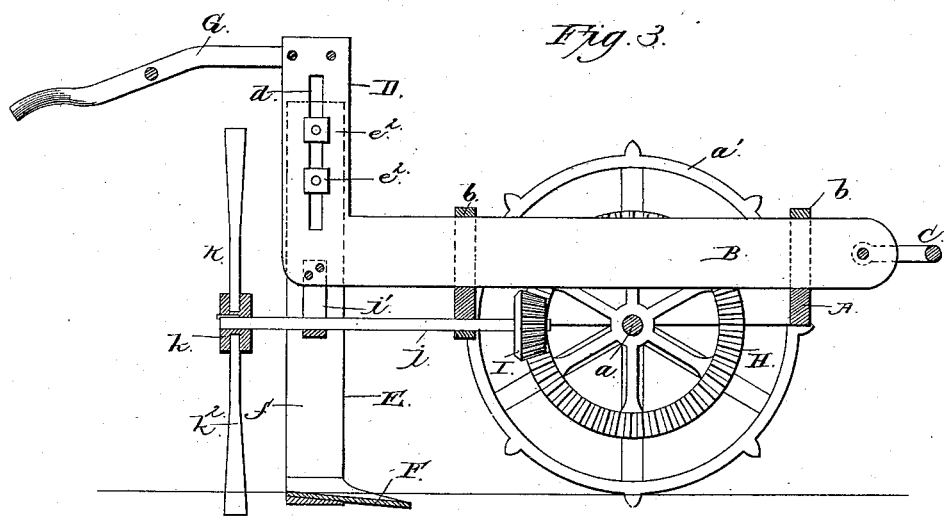
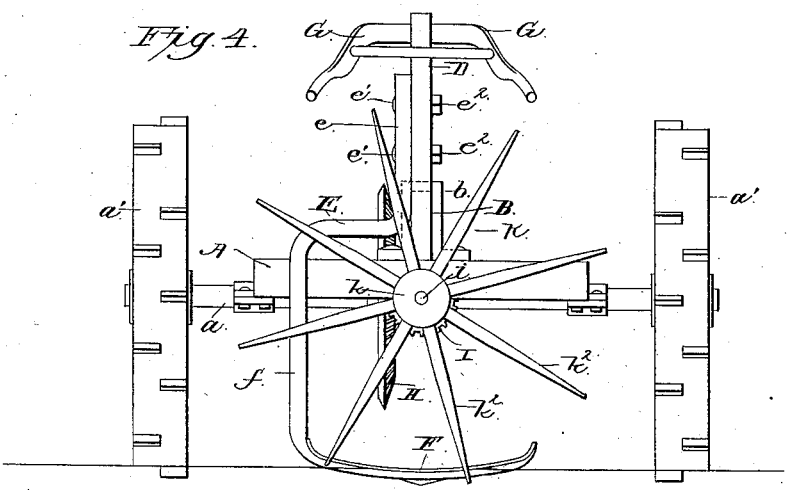
Witnesses
M. Fowler
E. G. Biggers
Inventor
Andrew J. Cowman
By his Attorneys,

UNITED STATES PATENT OFFICE.

ANDREW JAMES COWMAN, OF MONROE, IOWA.

POTATO-DIGGER.

SPECIFICATION forming part of Letters Patent No. 367,192, dated July 26, 1887.

Application filed March 29, 1887. Serial No. 232,892. (No model.)

*To all whom it may concern:*

Be it known that I, ANDREW JAMES COWMAN, a citizen of the United States, residing at Monroe, in the county of Jasper and State of Iowa, have invented a new and useful Improvement in Potato-Diggers, of which the following is a specification.

The invention relates to improvements in machines to dig potatoes, turnips, beets, and other esculent roots planted in rows, the objects being to dig and clean the said vegetables without slicing or cutting them, and to provide a machine for that purpose of simple construction and light draft.

The invention consists in the construction and arrangement of the plow-point or shovel and of the rotating spider, forming parts of the machine, and the combination of said elements with certain other parts, as hereinafter described, embraced in the appended claims, and illustated in the accompanying drawings, in which—

Figure 1 is a plan view of a machine embodying the invention. Fig. 2 is a side view of the same. Fig. 3 is a longitudinal section, and Fig. 4 is a rear elevation.

Referring to the drawings by letter, A designates the main frame of the machine, of rectangular form. $a$ designates the axle, journaled in bearings secured to the side rails of said frame, and $a'$ $a'$ are the wheels secured upon and turning with the axle.

B is the longitudinal draft-beam of the machine, attached centrally to the upper surface of the frame A by the clips or straps $b$ $b$, which pass over the said beam and have their outwardly-turned ends bolted, respectively, to the front and rear rails of the frame.

C is a clevis pivoted to the front end of the draft-beam, the rear end, D, of the latter being bent vertically upward and provided with a vertical slot, $d$, for the adjustable attachment of the plow-standard E. The said standard has an upright arm, $e$, through openings in which pass the bolts $e'$, extending through the slot $d$ and engaging nuts $e^2$ on the opposite side of the upward extension D of the plow-beam. Below the arm $e$ the standard bends outward to one side, then downward, and lastly inward, forming to the rear of the main frame a curved part, $f$, to which the plow-point or shovel F is secured in such manner as to be horizontal. The said shovel is concave on its upper surface, its side edges are at equal heights, and its point centrally behind the main frame.

G G are the handles secured to the top of the upright part D of the draft or plow beam, and having their ends bent down, to be easily grasped by the driver.

H is a crown-wheel, or very low beveled gear-wheel, secured upon the axle $a$ and meshing with a pinion, I, secured on the end of a longitudinal shaft, $i$, journaled in bearings $i'$ on the lower edge of the draft-beam.

K is a rotating spider, the hub $k$ of which is secured to the outer end of the shaft $i$ in rear of the shovel and standard, and with the ends of its radial arms or spokes $k^2$ entering to a proper depth the soil cut up by the shovel.

As the shovel is horizontal, it presents very little resisting-surface as it is dragged through the soil. Consequently, the draft of the machine must be very light.

On account of the side edges of the shovel being turned up to equal heights and having a concavity between them, the potatoes or other vegetables will not be thrown to either side, but will pass over the rear edge of the shovel, which cuts the soil away below them, and will be knocked out into the next row and cleared from pulverized earth by the rotating spokes of the spiders.

The outward extension and curve of the standard allows it to pass between the rows, so as not to be obstructed by the vines, and it is rendered adjustable by the described means upon the draft-beam B, to permit the shovel to be driven more or less deep in the soil, as circumstances require.

Having described my invention, I claim—

1. In a machine to dig esculent roots, such as potatoes, the combination of the draft-beam secured to the main frame, and having its rear end turned vertically upward and provided with a vertical slot, the standard rendered vertically adjustable on said rear end by means of set-screws passing through openings in the standard and through said slots, and nuts engaging the set-screws, the shovel secured to the standard, the rotating spider in rear of the shovel, and mechanism, substantially as described, to actuate the spider, as specified.

2. In a machine to dig esculent roots, the combination of the standard secured to the draft-beam, the shovel secured to the standard in a horizontal position, concave on its upper surface and with its side edges at equal heights, the rotating spider situated in rear of the shovel, and mechanism, substantially as described, to actuate said spider, as specified.

3. In a machine to dig esculent roots, the combination of the standard rendered vertically adjustable on the rear end of the draft-beam by means substantially as described, and bent below said beam, first outward, then downward, and slightly inward, so as to avoid being obstructed by the vines in the rows when the machine is in action, the shovel secured to the inwardly-bent part of the standard, the rotating spider, and mechanism, substantially as described, to actuate said spider, as specified.

4. In a machine to dig esculent roots, the draft-beam B, secured to the main frame, and having its rear end extended vertically upward, and provided with a slot, $d$, the axle journaled upon the main frame, the wheels turning with the axle, and the gear-wheel H, secured on the axle, in combination with the standard rendered vertically adjustable on the rear end of the draft-beam by means of the described slot and proper set-screws and nuts, and having its lower portion bent outwardly, downwardly, and then inwardly, the shovel F, secured to the curved lower part, $f$, of the standard, the shaft $i$, turning in bearings $i'$, secured to the lower edge of the draft-beam, the pinion I on said shaft and meshing with the wheel H, and the rotating spider K, having its hub $k$ secured on the rear end of the shaft $i$, and provided with the radial arms $k'$, substantially as specified.

In testimony that I claim the foregoing as my own I have hereto affixed my signature in presence of two witnesses.

ANDREW JAMES COWMAN.

Witnesses:
G. W. HERTZOG,
JOHN F. CALVIN.